(12) United States Patent
Ishikawa et al.

(10) Patent No.: US 9,513,134 B1
(45) Date of Patent: Dec. 6, 2016

(54) MANAGEMENT OF EVACUATION WITH MOBILE OBJECTS

(71) Applicant: International Business Machines Corporation, Armonk, NY (US)

(72) Inventors: Hiromi Ishikawa, Tokyo (JP); Atsushi Tsuchiya, Tokyo (JP); Gaku Yamamoto, Machida (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/970,609

(22) Filed: Dec. 16, 2015

(51) Int. Cl.
*G08B 17/12* (2006.01)
*G01C 21/34* (2006.01)
*H04W 4/22* (2009.01)

(52) U.S. Cl.
CPC .................. *G01C 21/3461* (2013.01)

(58) Field of Classification Search
CPC ........... G08B 17/12; H04W 4/22; H04W 4/02; H04L 12/18; G06Q 10/00
USPC ........... 701/118, 117, 482; 455/404.1, 404.2, 455/456.1, 521, 411.12; 340/601, 539.11, 577
See application file for complete search history.

(56) References Cited

U.S. PATENT DOCUMENTS

| | | | |
|---|---|---|---|
| 6,150,961 A | 11/2000 | Alewine et al. | |
| 7,395,151 B2 | 7/2008 | O'Neill et al. | |
| 7,447,588 B1 | 11/2008 | Xu et al. | |
| 7,689,348 B2 | 3/2010 | Boss et al. | |
| 7,710,421 B2 | 5/2010 | Muramatsu | |
| 7,899,611 B2 | 3/2011 | Downs et al. | |
| 7,979,172 B2 | 7/2011 | Breed | |
| 8,000,887 B2 | 8/2011 | Nathan et al. | |
| 8,396,652 B2 | 3/2013 | Nomura | |
| 8,428,876 B2 | 4/2013 | Lee | |
| 8,620,510 B1 | 12/2013 | Meuth et al. | |
| 8,688,071 B1* | 4/2014 | Daly | H04B 1/38 455/404.2 |
| 8,749,392 B2* | 6/2014 | Wedig | G08B 7/066 340/286.05 |
| 8,768,012 B2 | 7/2014 | Satoh | |

(Continued)

FOREIGN PATENT DOCUMENTS

| | | |
|---|---|---|
| CN | 102147260 A | 8/2011 |
| CN | 102231231 A | 11/2011 |

(Continued)

OTHER PUBLICATIONS

IEEE, "Server—Definition," IEEE 100: The Authoritative Dictionary of IEEE Standards Terms, 2000, p. 1031, Seventh Edition.

(Continued)

*Primary Examiner* — Tan Q Nguyen
(74) *Attorney, Agent, or Firm* — Erik K. Johnson

(57) ABSTRACT

Evacuation of mobile objects is managed by a system including a processor; and one or more computer readable mediums collectively including instructions that, when executed by the processor, cause the processor to receive information of occurrence of a disaster, obtain information of a plurality of evacuation areas, obtain a plurality of locations, each location corresponding to a mobile object among a plurality of mobile objects in a geographic space, distribute the plurality of mobile objects into the plurality of evacuation areas according to a distribution based on the information of the plurality of evacuation areas and the plurality of locations.

20 Claims, 12 Drawing Sheets

(56) References Cited

U.S. PATENT DOCUMENTS

| | | | |
|---|---|---|---|
| 8,799,246 B2 | 8/2014 | Nomura et al. | |
| 8,818,608 B2 | 8/2014 | Cullinane et al. | |
| 8,850,013 B2 | 9/2014 | Waldman et al. | |
| 8,862,146 B2 | 10/2014 | Shatsky et al. | |
| 8,930,269 B2 | 1/2015 | He et al. | |
| 8,988,252 B2 | 3/2015 | Scholl et al. | |
| 2005/0065711 A1 | 3/2005 | Dahlgren et al. | |
| 2007/0049259 A1* | 3/2007 | Onishi | A62B 99/00 455/414.2 |
| 2007/0109303 A1 | 5/2007 | Muramatsu | |
| 2007/0241932 A1 | 10/2007 | Otero et al. | |
| 2008/0046134 A1 | 2/2008 | Bruce et al. | |
| 2009/0070024 A1 | 3/2009 | Burchard et al. | |
| 2009/0170467 A1* | 7/2009 | Nowlan | H04W 4/22 455/404.1 |
| 2009/0248758 A1 | 10/2009 | Sawai et al. | |
| 2009/0287405 A1 | 11/2009 | Liu et al. | |
| 2010/0036595 A1 | 2/2010 | Coy et al. | |
| 2010/0188265 A1 | 7/2010 | Hill et al. | |
| 2010/0199213 A1 | 8/2010 | Suzuki | |
| 2011/0037619 A1 | 2/2011 | Ginsberg et al. | |
| 2011/0205040 A1 | 8/2011 | Van Wiemeersch et al. | |
| 2012/0092187 A1 | 4/2012 | Scholl et al. | |
| 2012/0291049 A1 | 11/2012 | Park et al. | |
| 2013/0006925 A1 | 1/2013 | Sawai et al. | |
| 2013/0204524 A1 | 8/2013 | Fryer et al. | |
| 2013/0214939 A1 | 8/2013 | Washlow et al. | |
| 2013/0321397 A1 | 12/2013 | Chen et al. | |
| 2014/0120953 A1 | 5/2014 | Ingram et al. | |
| 2014/0136099 A1 | 5/2014 | Choi et al. | |
| 2014/0191858 A1 | 7/2014 | Morgan et al. | |
| 2014/0195214 A1 | 7/2014 | Kozloski et al. | |
| 2014/0236414 A1 | 8/2014 | Droz et al. | |
| 2014/0248899 A1 | 9/2014 | Emadzadeh et al. | |
| 2014/0278026 A1 | 9/2014 | Taylor | |
| 2014/0278029 A1 | 9/2014 | Tonguz et al. | |
| 2014/0289267 A1 | 9/2014 | Felix et al. | |
| 2015/0051822 A1 | 2/2015 | Joglekar | |
| 2015/0066284 A1 | 3/2015 | Yopp | |
| 2015/0120083 A1 | 4/2015 | Gurovich et al. | |
| 2015/0149019 A1 | 5/2015 | Pilutti et al. | |
| 2015/0179077 A1 | 6/2015 | Morgan et al. | |
| 2015/0296358 A1* | 10/2015 | Akutsu | H04W 4/02 455/404.2 |
| 2016/0065737 A1* | 3/2016 | Williams | H04M 1/72538 455/404.1 |

FOREIGN PATENT DOCUMENTS

| | | |
|---|---|---|
| CN | 102997928 A | 3/2013 |
| CN | 103247176 A | 8/2013 |
| CN | 103258043 A | 8/2013 |
| CN | 103971529 A | 8/2014 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2007286706 A | 11/2007 |
| JP | 2008123197 A | 5/2008 |
| JP | 2008123325 A | 5/2008 |
| JP | 2008262418 A | 10/2008 |
| JP | 2008294921 A | 12/2008 |
| JP | 2009277078 A | 11/2009 |
| JP | 2011158339 A | 8/2011 |
| JP | 4985119 B2 | 7/2012 |
| JP | 2012150515 A | 8/2012 |
| JP | 2012155286 A | 8/2012 |
| JP | 2013045242 A | 3/2013 |
| JP | 2013101119 A | 5/2013 |
| JP | 2013101120 A | 5/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015081057 A | 4/2015 |
| KR | 101354607 B1 | 1/2014 |
| WO | 2007140527 A1 | 12/2007 |
| WO | 2011081157 A1 | 7/2011 |
| WO | 2012167174 A1 | 12/2012 |
| WO | 2013167085 A2 | 11/2013 |

OTHER PUBLICATIONS

IEEE, "System—Definition," IEEE 100: The Authoritative Dictionary of IEEE Standards Terms, 2000, p. 1143-1144, Seventh Edition.

Abrougui et al., "Efficient load balancing and QoS-based location aware service discovery protocol for vehicular ad hoc networks," EURASIP Journal on Wireless Communications and Networking, Mar. 2012, p. 1-15, Springer.

Aulinas et al., "Local map update for large scale SLAM," Electronics Letters, Apr. 15, 2010, p. 1-2, vol. 46, No. 8.

Dangel et al., "Can Road Traffic Volume Information Improve Partitioning for Distributed SUMO?," Modeling Mobility with Open Data, Lecture Notes in Mobility, 2015, p. 61-74, Springer International Publishing.

DRM, "Local Dynamic Map," DRM Research Seminar, Jun. 30, 2010, p. 1-72, Japan Digital Road Map Association.

Hong et al., "A grid-based node split algorithm for managing current location data of moving objects," The Journal of Supercomputing, Dec. 2007, p. 321-337, vol. 42, Issue 3, Springer.

Hsu et al., "Automatic Traffic Monitoring Method Based on Cellular Model," Fifth International Conference on Intelligent Information Hiding and Multimedia Signal Processing, 2009, p. 640-643, IEEE Computer Society.

Ihm et al., "Advanced Spatial Data Management for Enterprise Applications," An Oracle White Paper, Aug. 2010, p. 1-16, Oracle Spatial 11g.

Openstreetmap, "QuadTiles," OpenStreetMap Wiki, Last Modified on Mar. 3, 2014, p. 1-10, http://wiki.openstreetmap.org/wiki/QuadTiles, Accessed on Jun. 15, 2015.

Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.

Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.

Schade, "Sharing Data by Means of a Local Dynamic Map," Understanding the Standards for Cooperative ITS, Feb. 6, 2014, p. 1-10, Mines ParisTech, Transportation Sustainability Environment Consulting.

Suzumura et al., "X10-based Massive Parallel Large-Scale Traffic Flow Simulation," ProVISION, Winter 2012, p. 74-79, No. 72, IBM Professionals' Papers.

Y et al., "A Complex Event Processing System Approach to Real Time Road Traffic Event Detection," Journal of Convergence Information Technology (JCIT), Oct. 2013, p. 142-148, vol. 8, No. 15.

Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.

IBM, "List of IBM Patents Applications Treated as Releated (Appendix P)," Mar. 28, 2016, p. 1-3.

Gotoh et al., "Geographic Space Management," Application and Drawings, filed Jun. 19, 2015, p. 1-97, U.S. Appl. No. 14/744,052.

Gotoh et al., "Geographic Space Management," Application and Drawings, filed Jun. 25, 2015, p. 1-95, U.S. Appl. No. 14/750,298.

Gotoh et al., "Geographic Space Management," Application and Drawings, filed Jun. 25, 2015, p. 1-95, U.S. Appl. No. 14/750,334.

Gotoh et al., "Geographic Space Management," Application and Drawings, filed Jul. 8, 2015, p. 1-93, U.S. Appl. No. 14/793,934.

Gotoh et al., "Geographic Space Management," Application and Drawings, filed Jun. 19, 2015, p. 1-95, U.S. Appl. No. 14/744,056.

Gotoh et al., "Geographic Space Management," Application and Drawings, filed Jul. 16, 2015, p. 1-92, U.S. Appl. No. 14/800,774.

(56) References Cited

OTHER PUBLICATIONS

Gotoh et al., "Geographic Space Management," Application and Drawings, filed Jul. 16, 2015, p. 1-92, U.S. Appl. No. 14/800,782.
Gotoh et al., "Geographic Space Management," Application and Drawings, filed Jun. 19, 2015, p. 1-94, U.S. Appl. No. 14/744,066.
Gotoh et al., "Geographic Space Management," Application and Drawings, filed Jul. 16, 2015, p. 1-91, U.S. Appl. No. 14/800,795.
Gotoh et al., "Geographic Space Management," Application and Drawings, filed Jul. 16, 2015, p. 1-91, U.S. Appl. No. 14/800,811.
Gotoh et al., "Geographic Space Management," Application and Drawings, filed Jun. 19, 2015, p. 1-93, U.S. Appl. No. 14/744,067.
Gotoh et al., "Geographic Space Management," Application and Drawings, filed Jul. 16, 2015, p. 1-91, U.S. Appl. No. 14/800,821.
Gotoh et al., "Geographic Space Management," Application and Drawings, filed Jul. 16, 2015, p. 1-91, U.S. Appl. No. 14/800,839.
Gotoh et al., "Management of Moving Objects," Application and Drawings, filed Jun. 19, 2015, p. 1-46, U.S. Appl. No. 14/744,071.
Gotoh et al., "Management of Moving Objects," Application and Drawings, filed Jul. 17, 2015, p. 1-46, U.S. Appl. No. 14/802,289.
Gotoh et al., "Management of Moving Objects," Application and Drawings, filed Jul. 17, 2015, p. 1-46, U.S. Appl. No. 14/802,316.
Yamamoto, "Management of Moving Objects," Application and Drawings, filed Jun. 19, 2015, p. 1-59, U.S. Appl. No. 14/744,074.
Yamamoto, "Management of Moving Objects," Application and Drawings, filed Jul. 17, 2015, p. 1-58, U.S. Appl. No. 14/802,343.
Yamamoto, "Management of Moving Objects," Application and Drawings, filed Jul. 17, 2015, p. 1-58, U.S. Appl. No. 14/802,361.
Gotoh et al., "Management of Events and Moving Objects," Application and Drawings, filed Jul. 7, 2015, p. 1-69, U.S. Appl. No. 14/792,805.
Gotoh et al., "Management of Events and Moving Objects," Application and Drawings, filed Jul. 16, 2015, p. 1-68, U.S. Appl. No. 14/801,014.
Gotoh et al., "Management of Events and Moving Objects," Application and Drawings, filed Jul. 16, 2015, p. 1-68, U.S. Appl. No. 14/801,054.
Miyahira et al., "Management of Mobile Objects and Service Plaform for Mobile Objects," Application and Drawings, filed Dec. 16, 2015, p. 1-69, U.S. Appl. No. 14/970,596.
Nishimura et al., "Management of Dynamic Events and Moving Objects," Application and Drawings, =filed Dec. 16, 2015, p. 1-92, U.S. Appl. No. 14/970,600.
Ishikawa et al., "Management of Evacuation With Mobile Objects," Application and Drawings, filed Dec. 16, 2015, p. 1-50, U.S. Appl. No. 14/970,609.
Gotoh et al., "Geographic Space Management," Application and Drawings, filed Dec. 16, 2015, p. 1-72, U.S. Appl. No. 14/970,616.
Ishikawa et al., "Management of Mobile Objects and Resources," Application and Drawings, filed Dec. 16, 2015, p. 1-52, U.S. Appl. No. 14/970,626.
Gotoh et al., "Management of Mobile Objects," Application and Drawings, filed Dec. 16, 2015, p. 1-65, U.S. Appl. No. 14/970,631.
Ishikawa et al., "Management of Mobile Objects," Application and Drawings, filed Dec. 16, 2015, p. 1-78, U.S. Appl. No. 14/970,643.

* cited by examiner

MANAGEMENT OF EVACUATION WITH MOBILE OBJECTS

BACKGROUND

The present invention relates to a system for managing evacuation with mobile objects.

A driver assistance system manages event information such as car accidents on a map, and sends the event information and car control information to each car. On the other hand, protection of people and property from disaster is an important challenge. Usually, evacuation by cars should be avoided because mass evacuation activity by cars will likely cause congestion on roads. Currently, there is no system to alleviate any congestion in the event of a disaster.

SUMMARY

Therefore, it is an object of an aspect of the innovations herein to provide a system including a processor and one or more computer readable mediums collectively including instructions that, when executed by the processor, cause the processor to receive information of an occurrence of a disaster, obtain information of a plurality of evacuation areas, obtain a plurality of locations, each location corresponding to a mobile object among a plurality of mobile objects in a geographic space, distribute the plurality of mobile objects into the plurality of evacuation areas according to a distribution based on the information of the plurality of evacuation areas and the plurality of locations. The first aspect may enable the system to manage evacuation of passengers of mobile objects from disaster.

A second aspect of the invention may include a computer-implemented method performed by the system of the first aspect. A third aspect of the invention may include a computer program product comprising a non-transitory computer readable storage medium having program instructions embodied therewith, the program instructions executable by a computer to cause the computer to perform the method of the second aspect.

The summary clause does not necessarily describe all of the features of the embodiments of the present invention. The present invention may also be a sub-combination of the features described above. The above and other features and advantages of the present invention will become more apparent from the following description of the embodiments, taken in conjunction with the accompanying drawings.

DETAILED DESCRIPTION

Hereinafter, example embodiments of the present invention will be described. These example embodiments shall not limit the claims, and not all of the combinations of the features described in the embodiments are necessarily essential to the invention.

Figure 1:
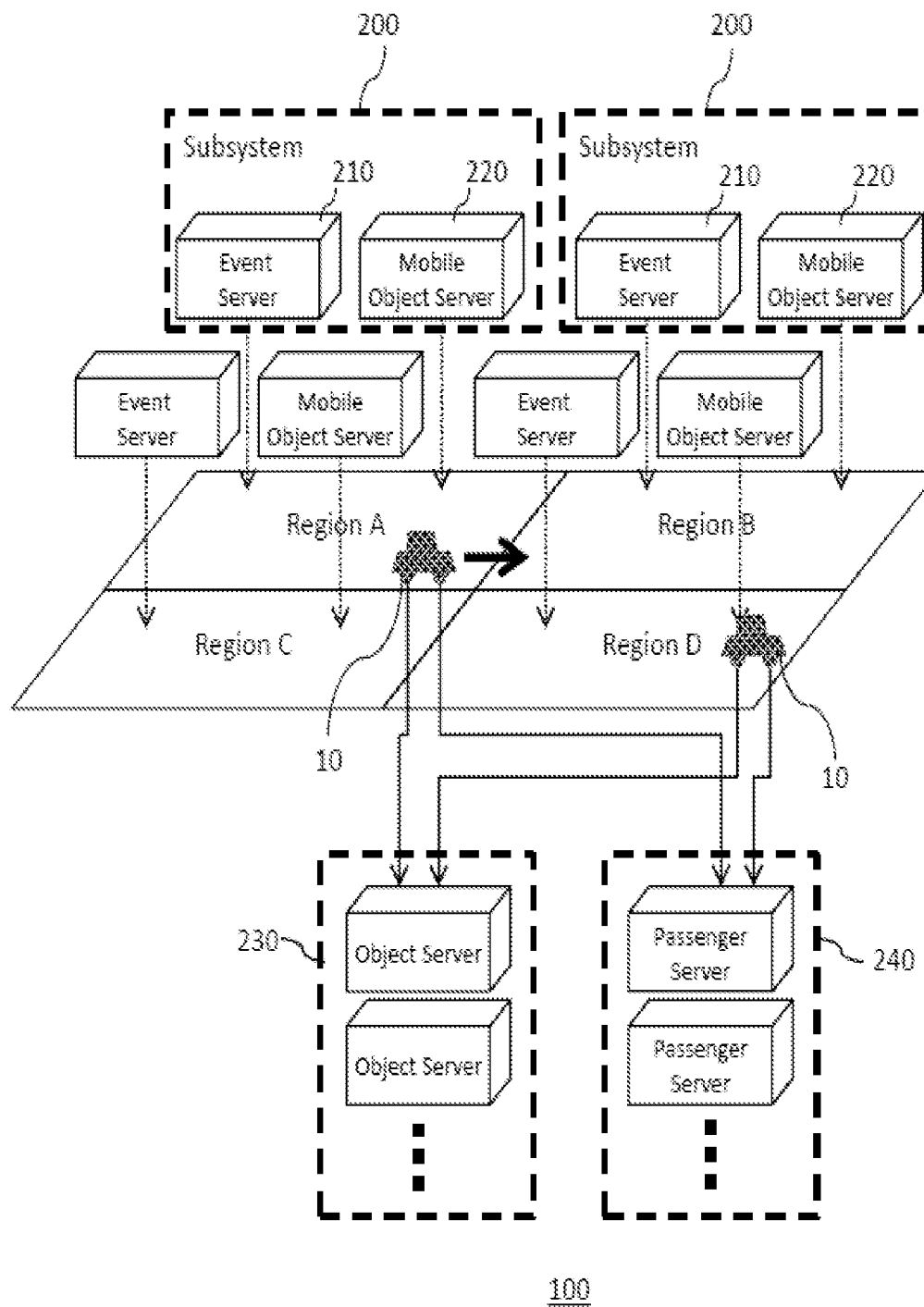
FIG. 1 shows a system 100 and a map area corresponding to a geographic space managed by the system 100 according to an embodiment of the present invention.

FIG. 1 shows a system 100 and a map area corresponding to a geographic space managed by the system 100, according to an embodiment of the present invention. The system 100 manages a geographic space that includes routes on which a mobile object 10 moves. The system 100 is operable to divide the geographic space into a plurality of regions and manage these regions.

A mobile object 10 may move on routes including 1 and routes, sea routes, and/or air routes, for example. The geographic space may be land, sea, or air space that includes the routes on which the mobile object travels. The mobile objects 10 may be manned/unmanned automobiles, motorbikes, bicycles, humans having a digital device, airplanes, vessels, drones, or the like.

FIG. 1 shows an automobile as an example of the mobile object 10, which moves along roads as examples of land routes. The system 100 includes a plurality of subsystems 200 that respectively manage the plurality of regions. FIG. 1 shows an example in which the whole map area is divided into four regions from region A to region D, and four subsystems 200 respectively manage these four regions.

System 100 comprises a plurality of event servers 210, a plurality of mobile object servers 220, a plurality of object servers 230, and a plurality of passenger servers 240. According to the embodiment of FIG. 1, each of the subsystems 200 may include at least one of the plurality of event servers 210 and one of the plurality of mobile object servers 220.

The event server 210 manages events occurring in each region of the geographic space. In this embodiment, the event server 210 of subsystem 200 assigned to region A may manage events in region A. The plurality of mobile object servers 220 respectively assigned to a plurality of regions in a geographic space manage the mobile objects 10 in each of the plurality of regions. In this embodiment, the mobile object server 220 assigned to region A may manage mobile objects 10 located in region A. The object server 230 manages information of the mobile objects 10 regardless of the location of the mobile objects 10. The passenger server 240 manages information of at least one passenger riding on the mobile objects 10.

Each of the subsystems 200 may be implemented on one or more servers. In one embodiment, each event server 210 and mobile object server 220 may be implemented on one server. In another embodiment, a set of an event server 210 and a mobile object server 220 in a subsystem 200 may be implemented by one server. Portions of the system 100 other than the subsystems 200 may also be implemented on one or more servers. In one embodiment, each object server 230 and passenger server 240 may be implemented on one server. In another embodiment, a set of object servers 230 and a set of passenger servers 240 may each be implemented by one server. In yet another embodiment, all of the object servers 230 and the passenger servers 240 may be implemented on one server. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a mobile object 10 from the mobile object 10, and the mobile object server 220 managing the region that includes the acquired position of the mobile object 10 may manage the movement of this mobile object 10. The system 100 acquires information of events that have occurred to the mobile object 10 and/or on the road outside, and the event server 210 managing the region including the position where such an event has occurred may manage the state of the event.

This event may include information about accidents, obstructions, closure, limitation, status, or construction on the road, or information about the weather, temperature, buildings, shops, or parking lots near the road. In response to a setting or a request from the mobile object 10, the subsystem 200 may provide notification about the event information to the mobile object 10 that made the request. For example, if the mobile object 10 is moving on a route in a geographical area corresponding to region A, then the mobile object sever 220 managing region A provides this mobile object 10 with the notification about the event relating to the route.

Since the map area is divided into a plurality of regions, despite the mobile object 10 simply moving on a route, the region corresponding to the position of the mobile object 10 might change. FIG. 1 shows an example in which the mobile object 10 is driving on a road such that the position of the mobile object 10 moves from region A to region B. In this case, according to the movement of the mobile object 10, the system 100 may transfer the information concerning the mobile object 10 from the mobile object server 220 managing region A to the mobile object server 220 managing region B, and may also transfer the management of the mobile object 10 to the mobile object server 220 managing region B.

The system 100 may include a driver assistance system or an automated driving system. The system 100 may assist evacuation of passengers of the mobile objects 10 in response to the occurrence of a disaster, as explained later.

Figure 2:
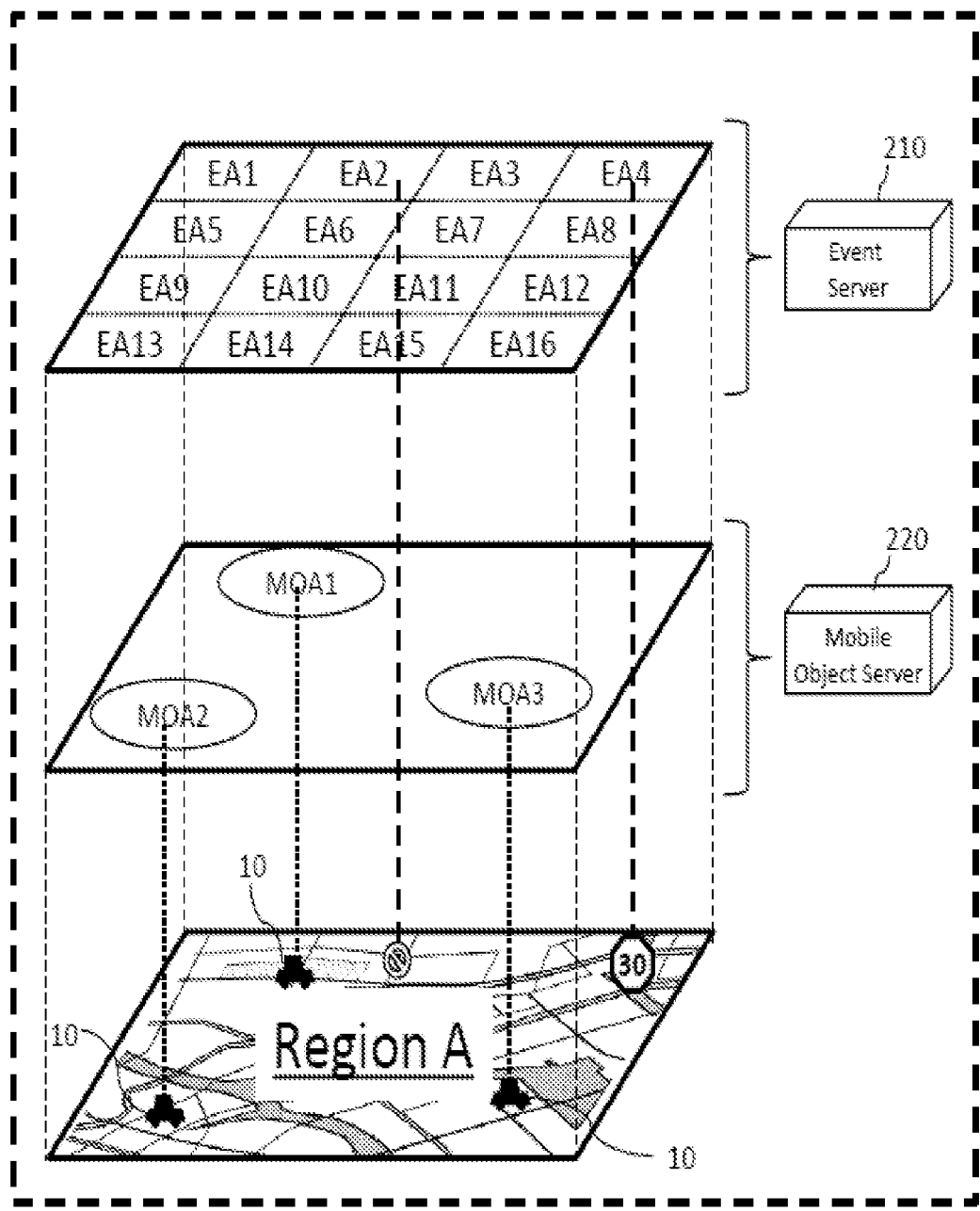
FIG. 2 shows a subsystem 200 and a map area corresponding to a region A managed by the subsystem 200 according to an embodiment of the present invention.

FIG. 2 shows a subsystem 200 and a map area corresponding to a region A managed by the subsystem 200, according to an embodiment of the present invention. The event server 210 manages at least one event agent, and executes each event agent to manage events on routes in a region assigned to the event server 210. An "agent" may be a software entity having specific data, and may operable to receive a message (e.g. command), and return a response message. Each region of the plurality of regions of geographic space includes at least a portion of one area of the plurality of areas. In this embodiment, the region assigned to the event server 210 is the same as the region assigned to the mobile object server 220. However, in other embodiments, these regions may be different.

In the embodiment of FIG. 2, the region A, which is the region assigned to the event server 210, is divided into 16 areas and each area is assigned to one of the event agents EA1-EA16. The event server 210 executes each of the event agents EA1-EA16 to manage events occurring on routes of each area of region A. For example, the event agent EA2 may manage a "closure" event on an area corresponding to EA2 on the map, and the event agent EA4 may manage a "speed limit" event on an area corresponding to EA4 as shown in FIG. 2.

The event server 210 also executes each of the event agents EA1-EA16 to manage status of a plurality of routes located on each area of region A. In one embodiment, the event agent EA2 may manage a plurality of routes on an area corresponding to EA2 on the map.

The plurality of mobile object servers 220 may include at least one mobile object server 220, each of which includes one or more mobile object agents assigned to each of the mobile objects 10. In the embodiment of FIG. 2, the mobile object server 220 includes three mobile object agents (MOAs) 1-3 assigned to three mobile objects 10 in the assigned region A. The mobile object server 220 executes each of the mobile object agents MOA1-MOA3 to manage the mobile objects 10 traveling on the region A.

Figure 3:
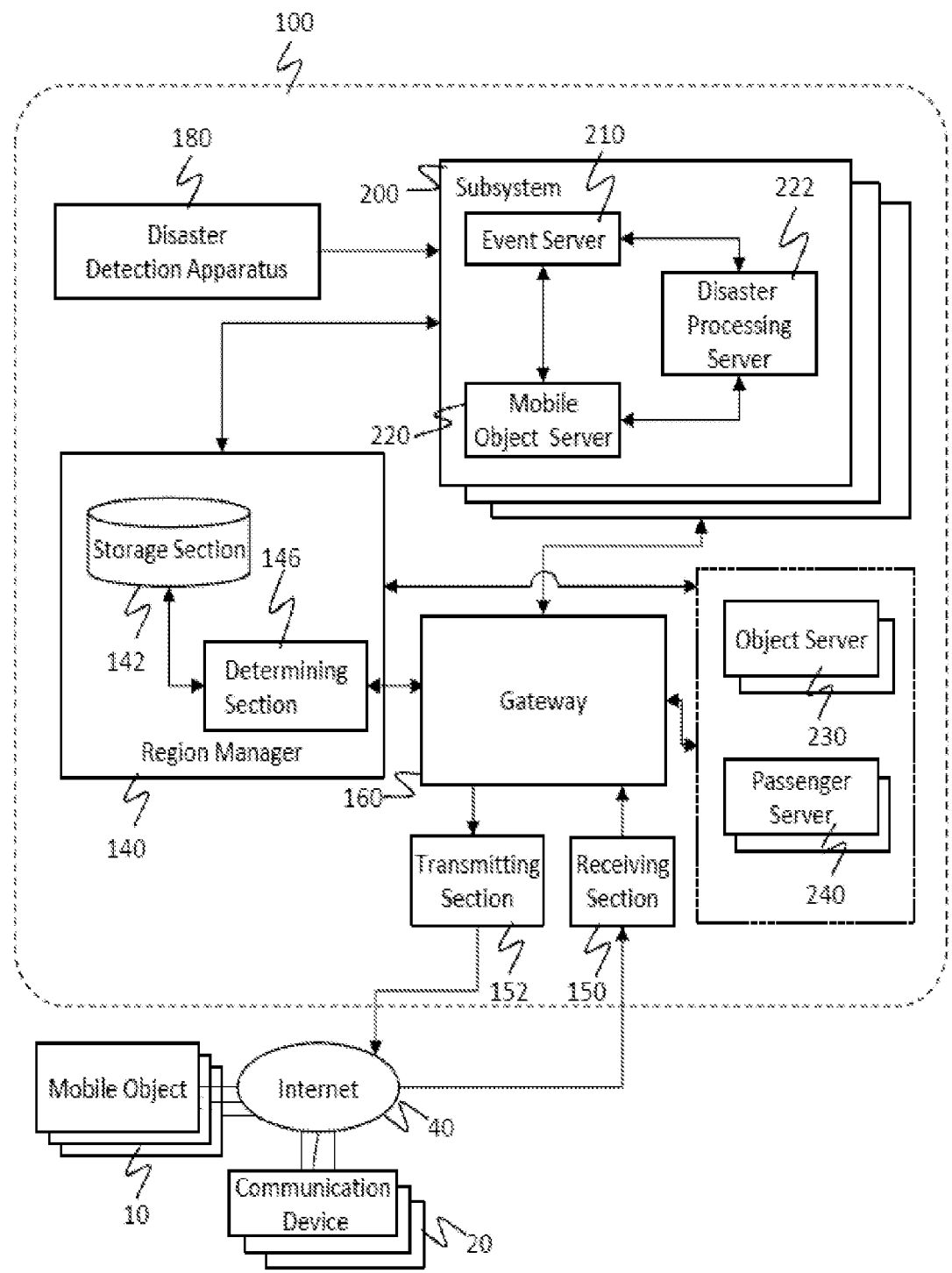
FIG. 3 shows a first exemplary configuration of the system 100 according to an embodiment of the present invention.

FIG. 3 shows an exemplary configuration of the system 100, according to an embodiment of the present invention. The system 100 may be operable to communicate with each of a plurality of mobile objects 10 to send and receive the information used to manage the mobile objects 10.

The system 100 may also be operable to communicate with a plurality of communication devices 20. The plurality of communication devices 20 may be cellular phones, smart phones, portable digital assistants, laptop computers, tablet computers, or other types of communication devices. Some of the plurality of communication devices 20 may be owned by passengers of the mobile objects 10.

The system 100 may be operable to communicate with the mobile objects 10 and/or the communication devices 20, through the Internet, a subscriber network, a cellular network, or any desired combination of networks. The system 100 includes a region manager 140, a receiving section (i.e., module) 150, a transmitting section 152, a gateway apparatus 160, a disaster detection apparatus 180, a plurality of subsystems 200, a plurality of object servers 230, and a plurality of passenger servers 240.

The region manager 140 may be operable to store information concerning the plurality of regions including borders between regions. The region manager 140 may be operable to specify the subsystem 200 managing the region that includes the position of the mobile object 10 and the communication devices 20, in response to receiving the position of the mobile object 10 and the communication devices 20. The region manager 140 may be implemented on one or more servers.

The storage section 142 may be operable to store information concerning the plurality of regions. The storage section 142 may store setting values or the like of the system 100.

The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The determining section 146 may be operable to communicate with the storage section 142, and determine one region from the plurality of regions (e.g., regions A-D of FIG. 1) in which each of the mobile objects 10 is located based on the position information of the mobile object 10 and geographic information of the plurality of regions.

The determining section may also determine one region from the plurality of regions in which each of the communication devices 20 is located based on the position information of the communication device 20 and geographic information of the plurality of regions. The determining section 146 may identify a route or position in the map area managed by the system 100 that corresponds to the position information of the mobile object 10 or the communication device 20.

The determining section 146 may store the position information of the mobile object 10, the position information of the communication device 20, and/or information of the determined region in the storage section 142, in association with the mobile object 10 and the communication device 20. The determining section 146 may store a history of the position information of the mobile object 10 and the communication device 20, and/or a history of the determined mobile object server 220 in the storage section 142. The determining section 146 may be a circuit, a shared or dedicated computer readable medium storing computer readable program instructions executable by a shared or dedicated processor, etc.

The receiving section 150 may be operable to receive information transmitted from each of the plurality of mobile objects 10 and each of the plurality of communication devices 20. Each mobile object 10 and each communication device 20 may transmit information at designated time intervals, and the receiving section 150 may sequentially receive this transmitted information. In this embodiment, the receiving section 150 may receive car probe data from each mobile object 10 and the location of each communication device 20 as the information. The car probe data may include information detected by the mobile object 10, such as position information (e.g., a current location) of the mobile object 10. The car probe data may further include destination information of the mobile object 10.

In one embodiment, the position information may include longitude and latitude (and optionally altitude information) of the mobile object 10 in an absolute coordinate system. In another embodiment, the mobile object 10 may determine its location in the absolute coordinate system by using GPS, and the determining section 146 receiving the position information may determine a route on which the mobile object 10 exists and a specific location of the route at which the mobile object 10 exists based on the position information. Alternatively, the mobile object 10 may include such detailed position information in the car probe data. The position information from the communication device 20 may include information similar to the position information of the car probe data.

The receiving section 150 may communicate with the plurality of mobile objects 10 and receive the car probe data of each mobile object 10, via the Internet 40. The receiving section 150 may also communicate with the plurality of communication devices 20 and receive the location data of each communication device 20, via the Internet 40. The receiving section 150 may receive the location data of the plurality of communication devices 20 through wireless communication, a subscriber network, a cellular network, or any desired combination of networks.

The transmitting section 152 may be operable to transmit event information and evacuation guidance to each of the mobile objects 10 according to settings, for example. The transmitting section 152 may transmit the evacuation guidance including an evacuation area, and event information concerning the route on which the mobile object 10 is expected to travel. The transmitting section 152 may be operable to transmit information to the communication devices 20. The transmitting section 152 may communicate with the mobile objects 10 and the communication devices 20 and transmit the information to the mobile objects 10 and the communication devices 20 via the Internet 40. The transmitting section 152 may transmit the information to the mobile objects 10 and the communication devices 20 through wireless communication, a subscriber network, a cellular network, or any desired combination of networks.

The gateway apparatus 160 may be operable to transfer communication between the plurality of subsystems 200 and the plurality of mobile objects 10 and the plurality of the communication devices 20. The gateway apparatus 160 may communicate with the receiving section 150 and receive the information transmitted by each mobile object 10 and each communication device 20.

The gateway apparatus 160 may communicate with the region manager 140 and demand the transfer destination for each piece of information received from the mobile objects 10 and information received from the communication devices 20. In response to this request, the gateway apparatus 160 may receive from the region manager 140 the information of the subsystem 200 managing the region on which the mobile object 10 or the communication device 20 exists.

The gateway apparatus 160 may communicate with each of the subsystems 200, and receive the information transmitted by each subsystem 200. The gateway apparatus 160 may transfer the information received from the mobile object 10 or the information received from the communication device 20 to the subsystem 200 that is to manage the mobile object 10 or the communication device 20. In other words, the gateway apparatus 160 may transfer the information received from each mobile object 10 and the information received from each communication device 20 to the subsystem 200 determined by the region manager 140.

The gateway apparatus 160 may communicate with the transmitting section 152 and supply the transmitting section 152 with the information received from each subsystem 200, such that this information is transferred to the mobile object 10 or the communication device 20 designated for each subsystem 200.

The gateway apparatus 160 may include a plurality of gateway devices, and may quickly perform transfer between the plurality of subsystems 200 and the plurality of mobile objects 10 and the plurality of the communication device 20. The gateway apparatus 160 may be a network that provides a connection between a plurality of networks using the same or different types of protocols.

The disaster detection apparatus 180 may detect an occurrence of a disaster, such as an earthquake, seismic sea wave, volcanic eruption, hurricane, flood, etc. The disaster detection apparatus 180 may detect the occurrence of a disaster in response to the disaster actually happening, or in response to a forecast of the disaster. The disaster detection apparatus 180 may provide the subsystems 200 with information of the detection of the disaster.

A plurality of subsystems 200 may be operable to communicate with the region manager 140 and the gateway apparatus 160 and to respectively manage a plurality of regions in a geographic space. Each subsystem 200 is operable to manage mobile objects 10 that travel routes in its managed region and to manage events and evacuations in its managed region.

As described, each subsystem 200 may include an event server 210 and a mobile object server 220 in communication with the event server 210. The subsystem 200 may further include a disaster processing server 222 in communication with the event server 210 and the mobile object server 220.

The event server 210 manages events occurring in its managed region with the plurality of the event agents. In one embodiment, the event server 210 may perform, through the event agent, (i) registration, update and/or deletion of events, (ii) registration, update and/or deletion of candidate events, and (iii) provision of event information. The event server 210 may include a first computer-readable medium storing a first set of instructions that causes the event server to perform functions executed by the event agents.

The mobile object server 220 manages the plurality of the mobile objects 10 traveling in its managed region with the plurality of the mobile object agents. The mobile object server 220 receives information, such as the car probe data, from the plurality of mobile objects 10 with the plurality of the mobile object agents. The mobile object server 220 may further receive information of disaster from the disaster processing server 222, and assist evacuation of the mobile objects 10 in the managed region.

In one embodiment, the mobile object server 220 may perform, through the mobile object agent, (i) processing of the car probe data, (ii) update of information of the mobile object, and (iii) provision of information to the mobile object 10. For example, the mobile object server 220 may execute the mobile object agent to collect information of events, and provide the mobile object 10 with information that assists or causes the mobile object 10 to travel in the geographic space.

The mobile object server 220 may further perform, through the mobile object agent, (iv) assisted driving or automated driving of the mobile object to evacuate from the disaster. The mobile object server 220 includes a second computer-readable medium storing a second set of instructions that causes the mobile object server to perform functions executed by the mobile object agents.

The disaster processing server 222 may manage evacuation with the mobile objects 10 from the disaster. In one embodiment, the disaster processing server 222 may obtain status of routes from the event server 210 and provide the mobile object server 220 with information used for the evacuation from the disaster. The detailed operations of the disaster processing server 222 are described later.

A plurality of object servers 230 including at least one object server 230 may communicate with the gateway 160 and include an object agent (OA) containing information of the mobile object 10. An object agent may correspond to each mobile object 10 and contain information thereof. In one embodiment, the object agent may contain (i) information, by region, of which subsystem currently manages a mobile object agent of the mobile object 10, (ii) an identification (ID) of the mobile object 10, (iii) an ID of a passenger of the mobile object 10, and (iv) a characteristic of the mobile object 10 (e.g., model/version information, width, length, and/or height of the mobile object 10).

The object server 230 may perform, through the object agent, (i) provision and/or update of information of the mobile object 10, (ii) registration, update, and/or deletion of the ID of passenger riding on the mobile object 10, (iii) provision and/or update of the information of the region of the mobile object 10, and (iv) provision of information needed for generation of a new mobile object agent by the mobile object server 220.

At least one passenger server 240 of a plurality of passenger servers may communicate with the gateway 160, and include a passenger agent that contains information of at least one passenger. A passenger agent may correspond to each passenger or candidate passenger of mobile objects 10, and contain information thereof. The passengers or candidate passengers may include owners of the plurality of communication devices 20. In one embodiment, the object agent may contain an ID of a passenger and a characteristic of the passenger (e.g., information of age, gender, type, and the like of license of the passenger). The passenger server 240 may perform, through the passenger agent, provision, and/or update of information of the passengers.

As described above, the system 100 of the present embodiment may manage the mobile objects 10 by utilizing the mobile object agents in each mobile object server 220, manage the events and by utilizing the event agent in each event server 210, and manage the evacuation of the mobile objects 10 by utilizing the disaster processing server 222. According to the system 100 of the embodiment, the system 100 can separately manage information relating to the mobile objects 10, events, and evacuation on the geographic map with a plurality of kinds of servers. Furthermore, each event server 210 may divide event management in one region among the plurality of event agents, and provide the mobile object agent with event/evacuation information, thereby improving the efficiency of event/evacuation management in the region and thus event notification and evacuation guidance to the mobile objects 10. In addition, the system 100 can provide the mobile object agent with information of mobile object 10 by the object agent of the object server 230. The system 100 can also provide the mobile object agent with information of passengers of the mobile objects 10 by the passenger agent of the passenger server 240.

Figure 4:
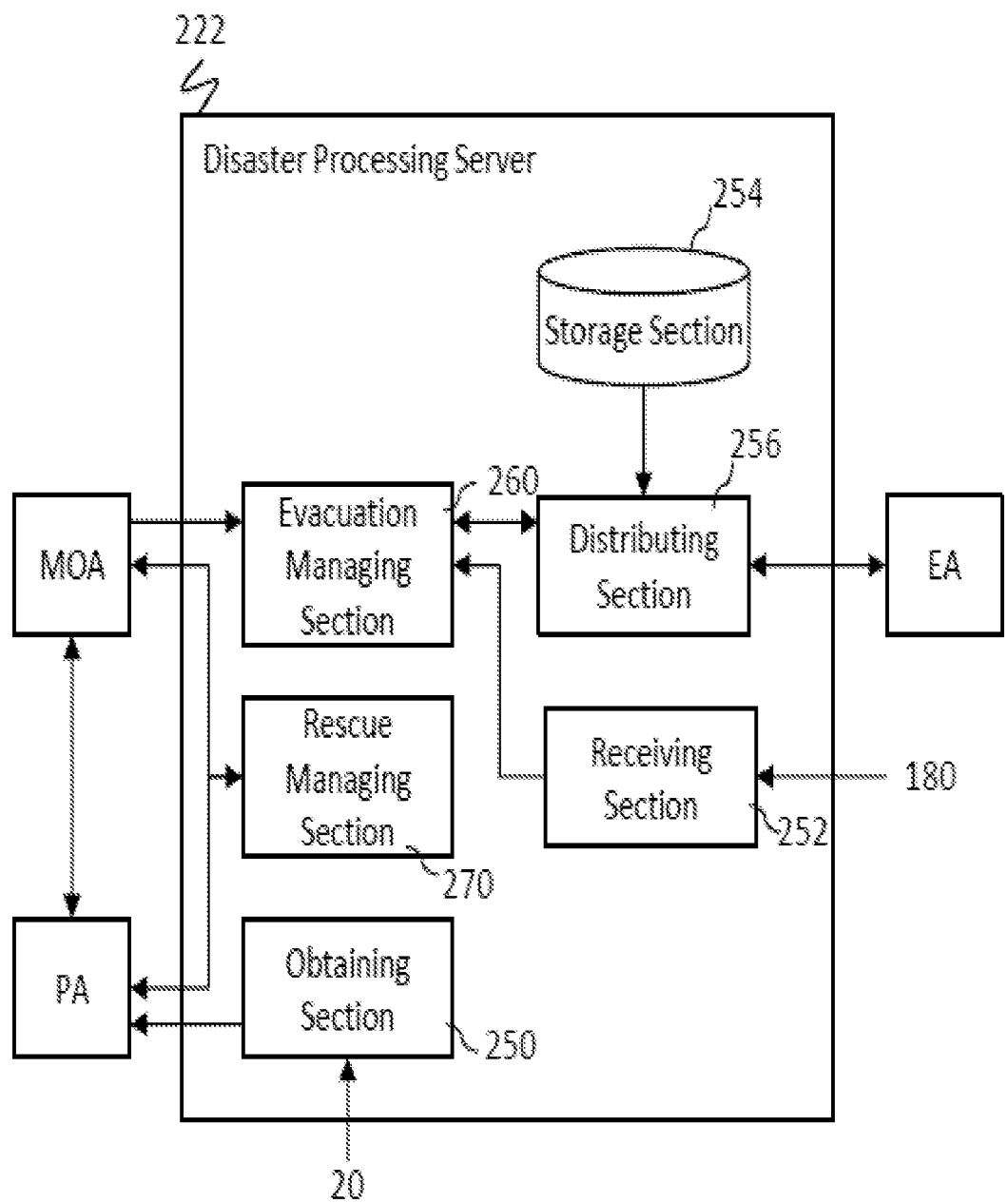
FIG. 4 shows an example of a configuration of the disaster processing server 222, according to an embodiment of the present invention.

FIG. 4 shows an exemplary configuration of the disaster processing server 222, according to an embodiment of the present invention. The disaster processing server may comprise a processor and one or more computer readable mediums collectively including instructions. The instructions, when executed by the processor, cause the processor to operate as a plurality of sections. Thereby, the disaster processing server 222 may be regarded as comprising an obtaining section 250, a receiving section 252, a storage section 254, a distributing section 256, an evacuation managing section 260, and a rescue managing section 270.

The obtaining section 250 may obtain a location of at least one evacuee from the communication devices 20. The obtaining section 250 may register and update the location of evacuees in the passenger agent (or PA in FIG. 4).

The receiving section 252 may receive information of occurrence of a disaster, from the disaster detection apparatus 180. The receiving section 252 may provide the received information with the evacuation managing section 260.

The storage section 254 may store information of evacuation areas. In one embodiment, the storage section 254 may store information of locations of the evacuation areas, types of the evacuation areas, capacities of the evacuation areas, and/or degrees of congestion of the evacuation areas.

The distributing section 256 may select an evacuation area for each mobile object 10. In one embodiment, the distributing section 256 may obtain information of a plurality of evacuation areas from the storage section 254. The distributing section 256 may also obtain a plurality of locations of the plurality of the mobile objects 10 from the evacuation managing section 260. Each location may correspond to a mobile object 10 among a plurality of mobile objects 10 in a geographic space. The distribution section 256 may also obtain status of route in the geographic space from the event agent (or EA in FIG. 4).

The distributing section 256 may distribute the plurality of mobile objects 10 into the plurality of evacuation areas according to a distribution based on (i) the information of the plurality of evacuation areas, (ii) the plurality of locations of the mobile objects 10, and/or (iii) the status of the route. The distributing section 256 may provide the evacuation managing section 260 with the result of the distribution.

The evacuation managing section 260 may manage an evacuation operation of the mobile objects 10 in response to the reception of the information of occurrence of the disaster from the receiving section 252. The evacuation managing section 260 may receive, from the mobile object agent (or MOA in FIG. 4), a request for the evacuation operation, and perform the evacuation operation with the mobile objects 10 on which the at least one assigned evacuee is aboard (which may be referred to as "evacuation target MO").

The evacuation managing section 260 may obtain the plurality of locations of the plurality of the mobile objects 10 from the plurality of evacuation target MOs via the MOAs.

The evacuation managing section 260 may further assign each evacuation target MO to the at least one evacuee, located near each evacuation target MO. The evacuation managing section 260 may provide the distributing section 256 with information of the evacuation target MOs 19.

The evacuation managing section 260 may receive the distribution of the evacuation area from the distributing section 256. The evacuation managing section 260 may send evacuation guidance to the evacuation target MOs according to the distribution, via the MOAs. Thereby, the evacuation managing section 260 may cause the MO 10 to move to an evacuation area among the plurality of evacuation areas in response to receiving information indicating that the at least one evacuee is aboard the MO 10.

The rescue managing section 270 may manage a rescue operation of the mobile objects 10. In one embodiment, the rescue managing section 270 may receive, from the MOA, information as to whether the at least one assigned evacuee is aboard the mobile object 10, and perform the rescue operation for the mobile objects 10 on which the at least one assigned evacuee is not aboard (which may be referred to as "rescue target MO").

The rescue managing section 270 may obtain a location of at least one evacuee from the PAs. The rescue managing section 270 may also obtain the plurality of locations of the plurality of the mobile objects 10 from the plurality of rescue target MOs via the MOAs.

The rescue managing section 270 may assign the rescue target MO among the plurality of mobile objects 10 to the at least one evacuee. The rescue managing section 270 may send rescue guidance to the rescue target MO via the MOA according to the assignment, to cause the assigned rescue target MO to move to the location of the at least one evacuee, to load the at least one evacuee on the rescue target MO.

The rescue managing section 270 may further perform a retreat operation to evacuate the mobile objects 10 without passengers. In one embodiment, the rescue managing section 270 may send retreat instructions to the mobile objects 10 that are not assigned to the at least one evacuee (which may be referred to as "retreat target MO") to cause the retreat target MO to move to an evacuation area without any evacuees on board.

As described above, the disaster processing server 222 may manage the evacuation operation to evacuate the mobile objects with their passengers, the rescue operation to rescue nearby evacuees, and the retreat operation to evacuate the mobile objects without passengers.

Figure 5:
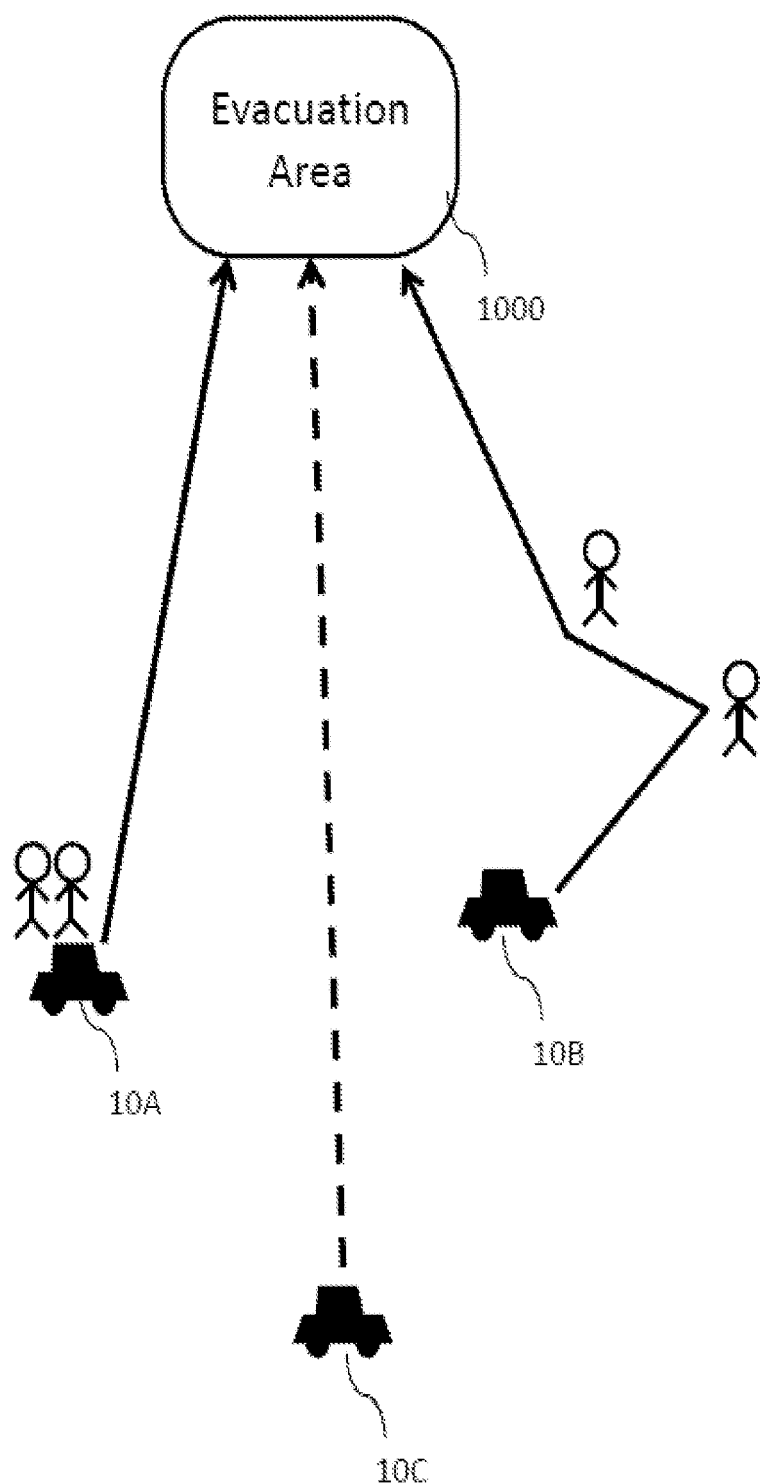
FIG. 5 shows an example of operations performed by the disaster processing server 222, according to an embodiment of the present invention.

FIG. 5 shows an example of operations performed by the disaster processing server 222, according to an embodiment of the present invention. In the embodiment of FIG. 5, the mobile object 10A is an evacuation target MO. As shown in the FIG. 5, the mobile object 10A has already loaded passengers (i.e., evacuees) and moves to an evacuation area according to the evacuation guidance.

The mobile object 10B is a rescue target MO. As shown in the FIG. 5, the mobile object 10B moves to locations of evacuees and loads evacuees according to the rescue guidance. Then the mobile object 10B may move to the evacuation area according to the evacuation guidance.

The mobile object 10C is a retreat target MO. As shown in the FIG. 5, the mobile object 10C moves to the evacuation area without evacuees according to the retreat guidance.

Figure 6:
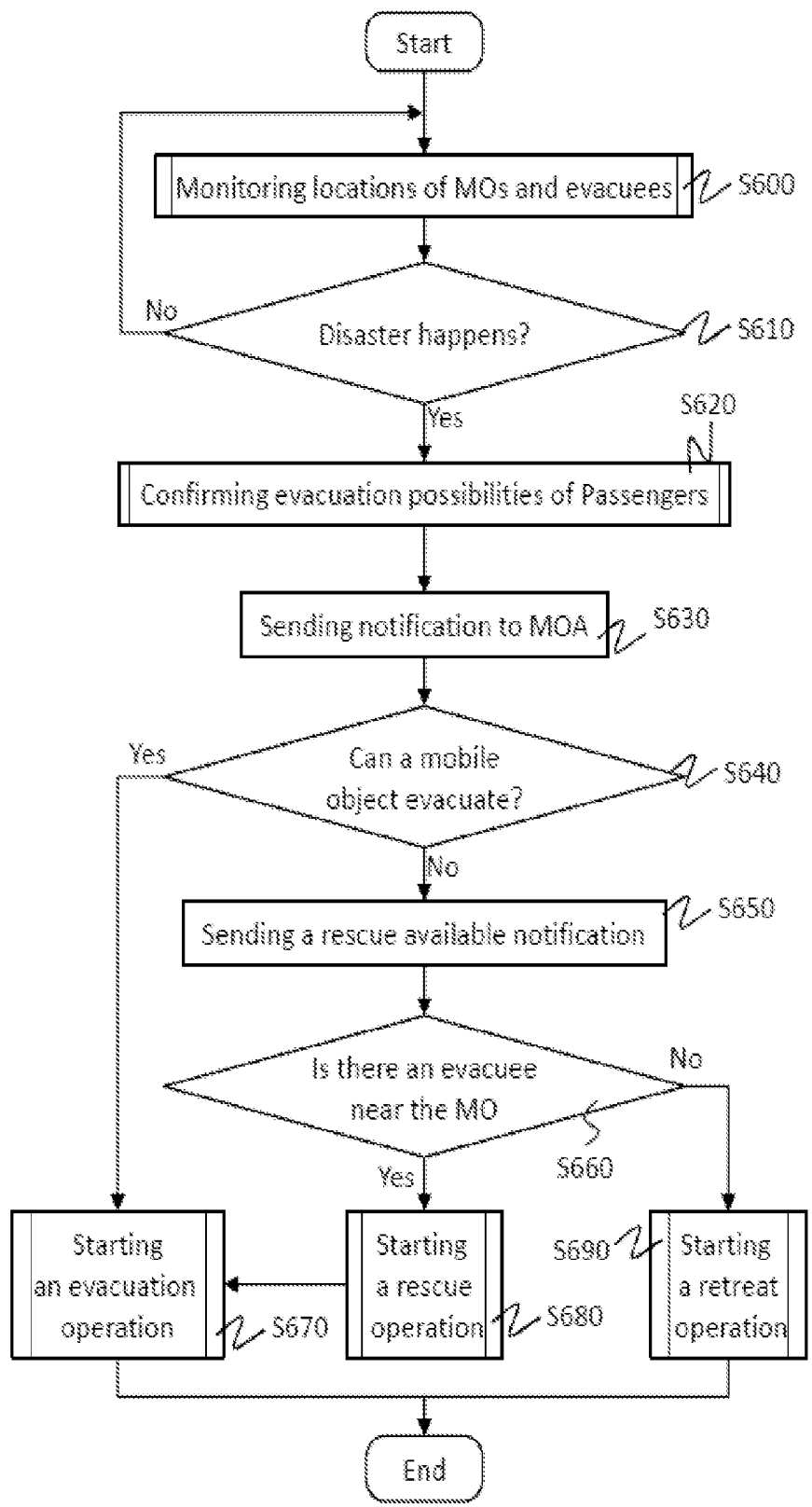
FIG. 6 shows an exemplary operational flow according to an embodiment of the present invention.

FIG. 6 shows an exemplary operational flow according to an embodiment of the present invention. The present embodiment describes an example in which a system such as the system 100 performs the operations from S600 to S690 shown in FIG. 6. FIG. 6 shows one example of the operational flow of the system shown in FIGS. 1-5, but the system 100 shown in FIGS. 1-5 is not limited to using this operational flow. Also, the operational flow in FIG. 6 may be performed by other systems.

First, at S600, the system may monitor locations of a plurality of mobile objects and locations of a plurality of evacuees. Details of the operation of S600 are described in relation with FIG. 7.

Next, at S610, a disaster detection apparatus, such as the disaster detection apparatus 180, may determine whether a disaster has occurred or not. In one embodiment, the disaster detection apparatus may detect a disaster (e.g., earthquake) when one or more sensors (e.g., seismograph) detects data indicative of a disaster (e.g., shaking greater than a threshold). If the disaster detection apparatus detects the disaster, then the disaster detection apparatus may send information of occurrence of a disaster to a disaster processing server such as the disaster processing server 222, and the system proceeds with S620. And if not, the disaster detection apparatus may wait for the detection of the disaster.

At S620, the disaster processing server may confirm whether evacuation of each MO is possible, by sending the confirmation message to the each MOA. Each MOA may send a confirmation message to each PA corresponding to passengers of the each MOA. Each PA may confirm whether its managing passenger is now aboard the MO or not. Details of the operation of S620 are described in relation with FIG. 8. The disaster processing server proceeds with S630.

Next at S630, each PA that performed the confirmation at S620 may send a notification to the corresponding MOA. In one embodiment, each PA may send a notification including information as to whether the at least one evacuee is aboard the MO. The each PA proceeds with S640. The notification may include information of passenger(s) including a driver who is aboard the MO.

Here, the disaster processing may perform operations of S640-S690 for each MO or PA.

At S640, the MOA may determine whether each mobile object can evacuate or not. In one embodiment, the MOA may proceed with an operation of S670 if the MOA receives the notification indicating that the at least one evacuee is aboard the MO and, may proceed with an operation of S650 if the at least one evacuee is not aboard the MO.

At S650, the MOA may send a rescue available notification to a rescue managing section such as the rescue managing section 270.

Next, at S660, the rescue managing section may determine whether there is an evacuee near the MO that corresponds to the MOA sending the rescue available notification. In one embodiment, the rescue managing section may determine whether any passengers are located near this MO by retrieving the PAs. If the determination is that passengers are location near this MO, then the rescue managing section may proceed with an operation of S680, and if no passengers, then proceed with S690.

At S670, the MOA may start an evacuation operation of the evacuation target MO by sending a request for the evacuation instructions to the evacuation managing section. Details of the operation of S670 are described in relation to FIG. 9.

At S680, the MOA may start a rescue operation of the rescue target MO by sending a request for the rescue instructions to the rescue managing section. After S680, the MOA may proceed with the operation of S670 or end the operation. Details of the operation of S680 are described in relation to FIG. 10.

At S690, the MOA may start a retreat operation of the retreat target MO by sending a request for the retreat guidance to the rescue managing section. Details of the operation of S680 are described in relation to FIG. 11.

Figure 7:
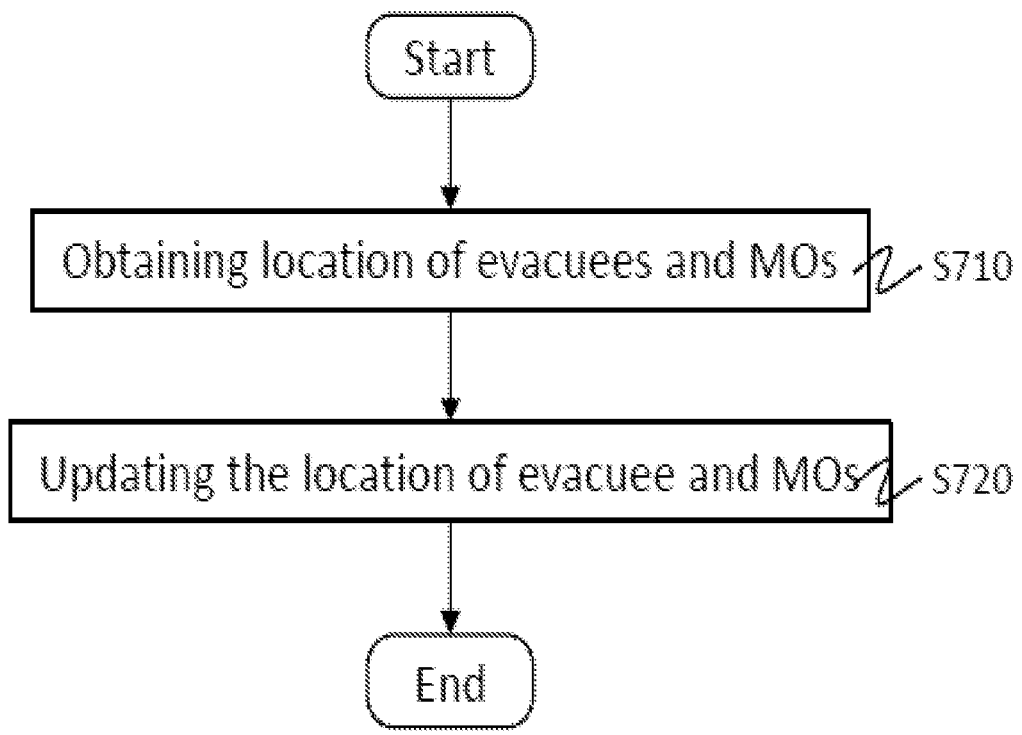
FIG. 7 shows an operational flow of location monitoring, according to an embodiment of the present invention.

FIG. 7 shows an operational flow of location monitoring, according to an embodiment of the present invention. The present embodiment describes an example in which the passenger server may perform the operations from S710 to S720 shown in FIG. 7 at the operation of S600 of FIG. 6.

At S710, the MOAs may receive a plurality of location information from corresponding mobile objects such as the mobile objects 10, where location information may include a current location of each mobile object. The PAs may receive location information from corresponding communication devices such as the communication devices 20 that are owned by passengers (or evacuees), where location information may include current location of each communication device.

At S720, the MOAs may register and update the locations of the communication devices. The PAs may register and update the locations of the communication devices.

Figure 8:
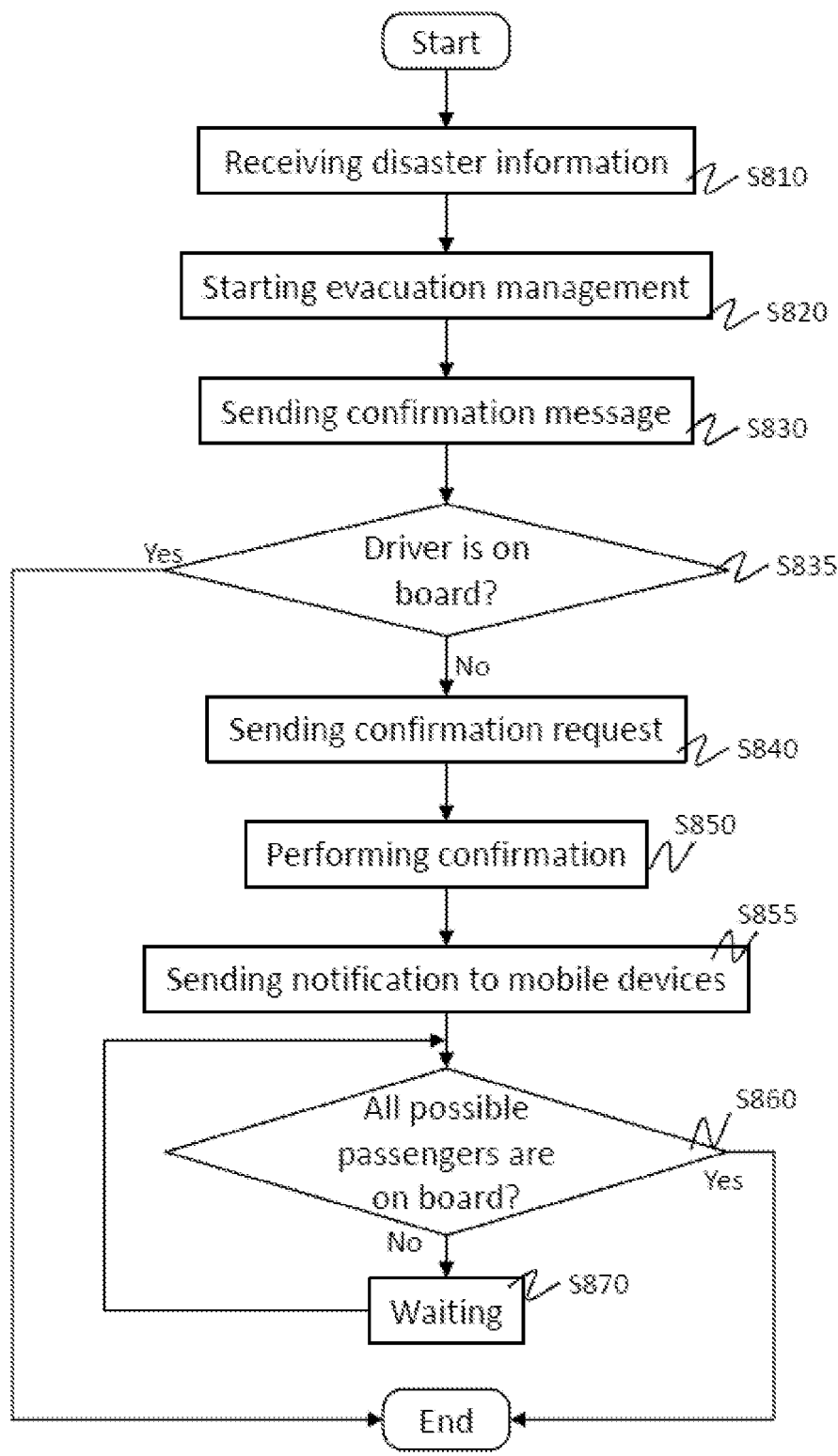
FIG. 8 shows an operational flow of evacuation possibility confirmation, according to an embodiment of the present invention.

FIG. 8 shows an operational flow of evacuation possibility confirmation, according to an embodiment of the present invention. The present embodiment describes an example in which a passenger server, such as the passenger server 240, may perform the operations from S810 to S870 shown in FIG. 8 for evacuation possibility confirmation, such as operation S620 of FIG. 6.

At S810, a receiving section, such as the receiving section 252, may receive information of occurrence of a disaster, from a disaster detection apparatus, such as the disaster detection apparatus 180. The receiving section may provide the received information with an evacuation managing section, such as the evacuation managing section 260.

Next at S820, the evacuation managing section may receive the information of occurrence of the disaster from the receiving section and start evacuation management.

Next at S830, the evacuation managing section may send a confirmation message to each of a plurality of MOAs of the mobile object server to confirm whether each MO managed by each MOA is able to evacuate.

Next at S835, each of the MOAs receiving the confirmation message at S830 may determine whether its managing MO (which may be referred to as "target MO") has loaded a passenger as a driver. If positive driver is loaded, then each of the MOAs may end the operation of S620 as the confirmation is complete. If a driver is not loaded, then each of the MOAs may proceed with S840.

At S840, each of the MOAs receiving the confirmation message at S830 may send a confirmation request to PAs that manage passengers related to the target MO. In one embodiment, each of the MOAs may send a confirmation request to PAs that manage passengers who drive the target MO or own the target MO, and/or are a family member of thereof. In one embodiment, each of the MOAs may send the location of the target MO with the confirmation request.

Next at S850, each of the PAs receiving the confirmation request at S840 may confirm whether its managing passenger (which may be referred to as "target passenger") is able to evacuate or not. In one embodiment, each PA may compare a location of the target passenger and a location of the target MO. Each of the PAs may determine that the target passenger is able to evacuate if a distance between the location of the target passenger and the location of the target MO is less than a threshold.

Next at S855, each of the PAs may send a notification including a result of the confirmation performed at S850 to a communication device owned by the target passenger. In one embodiment, the PAs may send the notification indicating that the target MO is located near a user and the user can evacuate from the disaster with the target MO, only to passengers determined to be able to evacuate at S850, with the location of the target MO.

Next at S860, the MOA managing the target MO may determine whether all passengers that received the notification at S855 are on board or not. If all passengers are aboard, then the MOA ends the operation of S620. If less than all passengers are aboard, then the MOA proceeds with S870 to wait until all passengers have boarded. In one embodiment, the MOA may end the operation of S620 when a predetermined time has passed during the loop of S860-S870.

Figure 9:
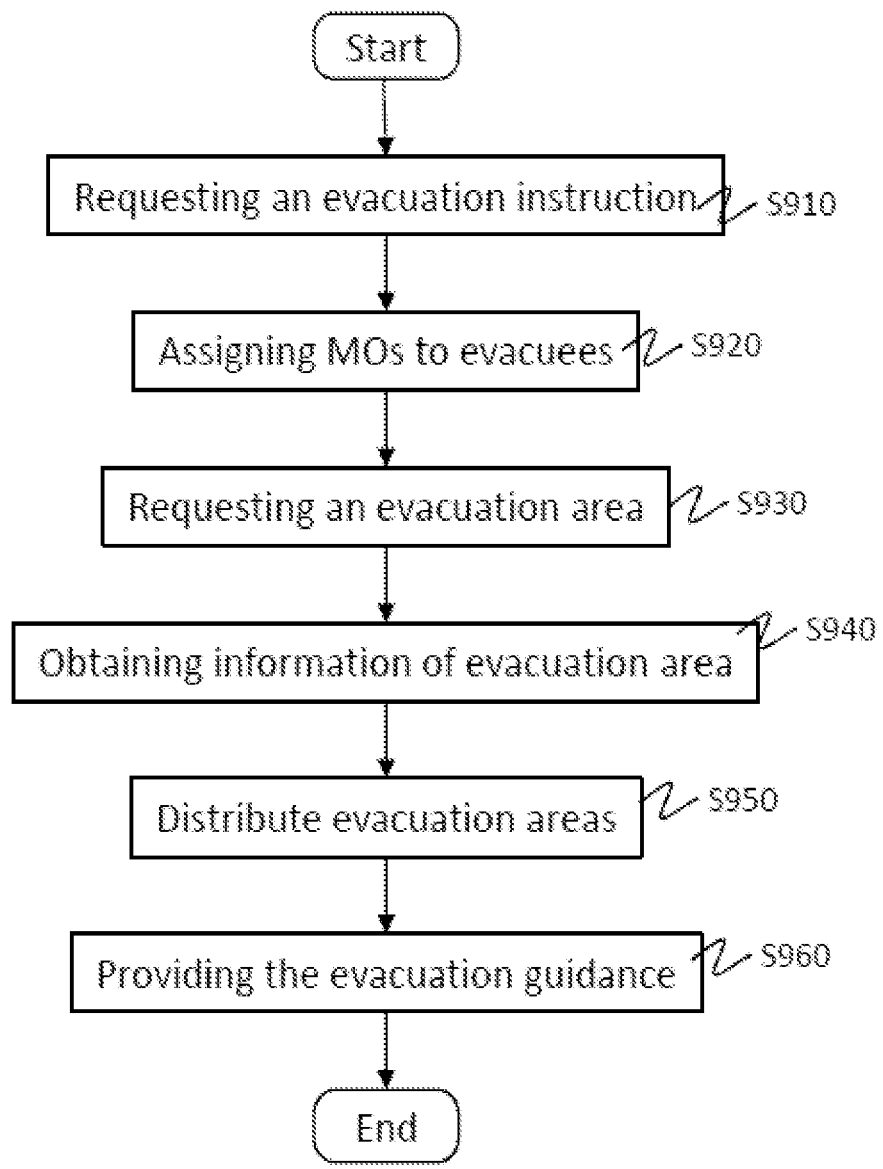
FIG. 9 shows an operational flow of an evacuation, according to an embodiment of the present invention.

FIG. 9 shows an operational flow of an evacuation, according to an embodiment of the present invention. The present embodiment describes an example in which the passenger server may perform operations from S910 to S960 shown in FIG. 9 for an evacuation, such as operation S670 of FIG. 6.

At S910, the MOA may send a request of evacuation instruction to an evacuating managing section, such as the evacuation managing section 260. The MOA may send information of the evacuation target MO (e.g., a current location, passengers, and/or characteristic of passengers) with the request.

Next at S920, the evacuation managing section may assign each of the evacuation target MOs to the at least one evacuee, who are passengers of each of the evacuation target MOs.

Next at S930, the evacuation managing section may request an evacuation area for each of the evacuation target MO to a distributing section such as the distributing section 256. The evacuation managing section may send information of each of the evacuation target MO (e.g., a current location, the number of passengers, and/or characteristic of passengers) with the request.

Next at S940, a distributing section, such as the distributing section 256, may obtain information of a plurality of evacuation areas from a storage section such as the storage section 254. The information of evacuation areas may include locations of the evacuation areas, types of the evacuation areas, capacity of the evacuation area, and/or degrees of congestion of the evacuation areas.

Next at S950, the distributing section may distribute the MOs into the plurality of evacuation areas according to a distribution based on the information of the plurality of evacuation areas and the plurality of information (e.g., locations, the number of passengers, and/or characteristic of passengers) of the evacuation target MOs. In one embodiment, the distributing section may select an evacuation area for the evacuation target MO based on information of the evacuation areas and the information of the evacuation target MO.

The distribution section may obtain the status of at least one route in the geographic space from EAs managing the at least one route. The distribution section may estimate a congestion of at least one route further based on the congestion of the at least one route. The distribution section may perform the distribution. The distribution section may provide the evacuation managing section with the result of the distribution.

Next at S960, the evacuation managing section may provide the MOA managing the evacuation target MO with the evacuation instructions. The evacuation instructions may include the location of the evacuation area assigned to the evacuation target MO.

The MOA may provide its managing evacuation target MO with evacuation guidance. The evacuation guidance may include guidance for a driver assistance system (e.g., a route navigation) to arrive at the evacuation area selected as S950, and/or, control information of automated driving to arrive at the evacuation area selected as S950. Thereby, the MOA may guide the evacuation target MO to the selected evacuation area.

The evacuation guidance may cause at least one MO among the plurality of mobile objects to select or avoid a specific route when moving to the selected evacuation area. In one embodiment, an EA may receive information including a status of a route from a MO among the plurality of MOs. For example, the EA may receive information that a route is broken or closed. The distributing section may receive the information including the status of the route from the EA, and provide the information to the evacuation managing section.

The evacuation managing section may receive the information including the status of the route from the distributing section, and may provide the MOA managing the evacuation target MO with the information including the status of the route. The MOA may provide the evacuation target MO with an evacuation guidance to cause the evacuation target MO to select or avoid the route based on the status of the route.

The MOA may provide the evacuation guidance according to a type of MO and the status of the route. In one embodiment, if the evacuation target MO is an amphibious vehicle, the MOA may provide the evacuation target MO with the evacuation guidance to traverse a swampy area (e.g., a paddy area, a pond, a river, a marsh, etc.). And if the evacuation target MO is a normal vehicle, the MOA may provide the evacuation target MO with the evacuation guidance to avoid the swampy area.

Figure 10:
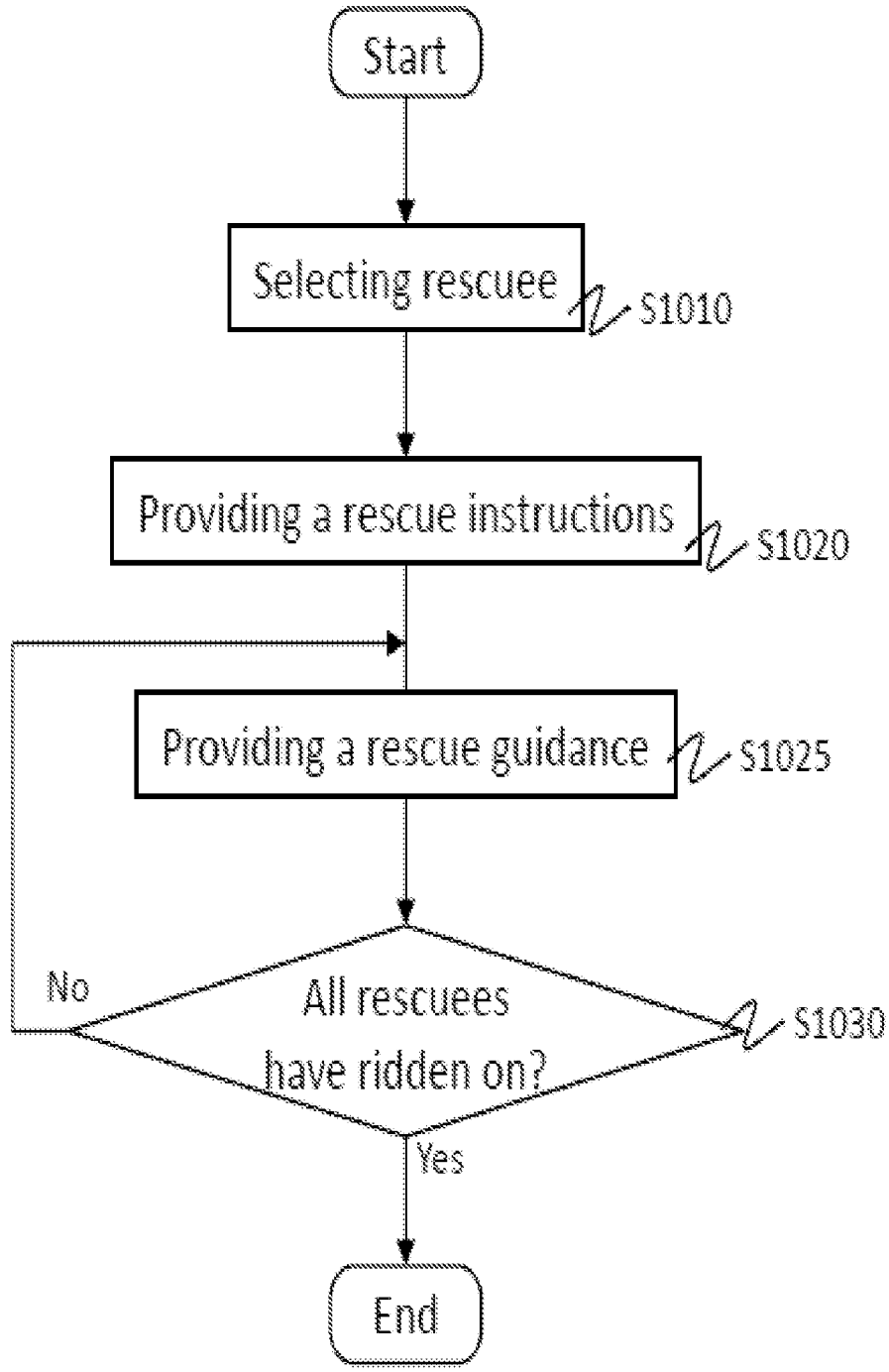
FIG. 10 shows an operational flow of a rescue operation, according to an embodiment of the present invention.

FIG. 10 shows an operational flow of a rescue operation, according to an embodiment of the present invention. The present embodiment describes an example in which the passenger server may perform the operations from S1010 to S1030 shown in FIG. 10 for a rescue operation, such as operation S680 of FIG. 6.

At S1010, a rescue managing section, such as the rescue managing section 270, may select at least one evacuee for evacuation by the rescue target MO. In one embodiment, the rescue managing section may select the evacuees of which number is the same as the current capacity of the rescue target MO in an order of closeness to the rescue target MO.

The rescue managing section may select an MO for evacuees at a location instead of selecting an evacuee. In one embodiment, the rescue managing section may select a rescue target MO among the plurality of rescue target MOs to assign to at least one evacuee based on a number of evacuees at a location of the at least one evacuee and a maximum number of passengers of the selected rescue target MO. For example, the rescue managing section may assign a MO having a great capacity (e.g., bus, truck, or van) to a location where people gather (e.g., school, company, park, or the like).

At S1020, the rescue managing section may provide the MOA managing the rescue target MO with rescue instructions. The rescue instructions may include the location of the evacuees selected at S1010.

At S1025, the MOA may provide its managing rescue target MO with rescue guidance. The rescue guidance may include guidance for a driver assistance system to arrive at the locations of the evacuees, and/or, control information of automated driving to arrive at the locations of the evacuees. Thereby the MOA may guide the rescue target MO to the locations of selected evacuees.

The MOA may send a message indicating that the rescue target MO is coming to the location of the at least one evacuee to a communication device of the at least one evacuee.

Next at S1030, the MOA may determine whether the evacuees selected at S1010 are all aboard. If all evacuees are aboard, then the MOA ends the process of S680, and if less than all evacuees are aboard, then the MOA may return to S1025 to rescue any remaining evacuees.

Figure 11:
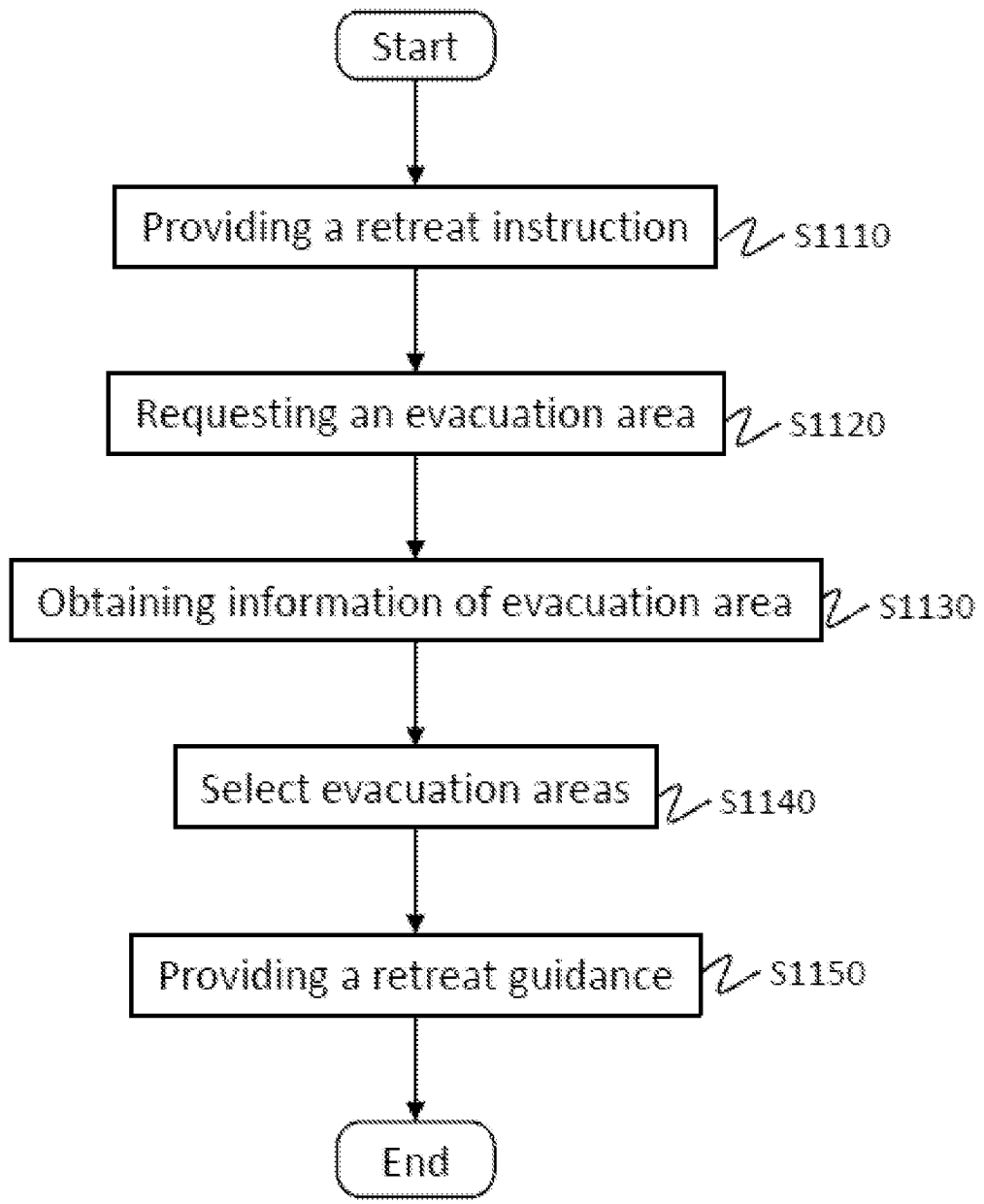
FIG. 11 shows an operational flow of a retreat, according to an embodiment of the present invention.

FIG. 11 shows an operational flow of a retreat, according to an embodiment of the present invention. The present embodiment describes an example in which the passenger server may perform the operations from S1110 to S1150 shown in FIG. 11 for a retreat, such as operation S690 of FIG. 6.

At S1110, a rescue managing section, such as the rescue managing section 270, may provide the MOA managing the retreat target MO with the retreat instructions.

At S1120, the MOA may send a request of an evacuation area for the retreat target MO, to an evacuation managing section, such as the evacuation managing section 260. The evacuation managing section may request an evacuation area for each of the evacuation target MOs to a distributing section, such as the distributing section 256. The evacuation managing section may send information of the retreat target MO (e.g., a current location, the number of passengers, and/or characteristic of passengers) with the request.

At S1130, the distributing section may obtain information of a plurality of evacuation areas from a storage section. The distributing section may perform the operation of S1130 in the same manner as the operation of S940.

At S1140, the distributing section may select an evacuation area for the retreat target MO. The distributing section may perform the operation of S1140 in the same manner as S950. The distribution section may provide the evacuation managing section with the result of the selection.

At S1150, the evacuation managing section may provide the MOA managing the retreat target MO with the retreat instructions. The evacuation instructions may include the location of the evacuation area assigned to the retreat target MO.

The MOA may provide its managing retreat target MO with retreat guidance, which may be similar to the evacuation guidance explained in relation to S960. Thereby, the MOA may guide the retreat target MO to the selected evacuation area.

During processing S670-S690, the evacuation managing section may set different priorities between the evacuation target MOs and the retreat target MOs. In one embodiment, the evacuation managing section may assign a higher priority of evacuation to at least one evacuation target MO among the plurality of MOs with at least one evacuee on board than at least one retreat target MO among the plurality of MOs without any evacuees on board. Thereby the evacuation managing section may cause the plurality of MOs to move to the plurality of evacuation areas based on the priority of evacuation.

In one embodiment, when setting the different priorities, the evacuation managing section may cause a first MO (e.g., the evacuation target MO) among the plurality of MOs having a higher priority than a second MO (e.g., the retreat target MO) among the plurality of MOs to pass the second MO. In one embodiment, when setting the different priorities, the evacuation managing section may cause a first MO (e.g., the evacuation target MO) among the plurality of mobile objects having a higher priority than a second MO (e.g., the retreat target MO) among the plurality of mobile objects to move before causing the second mobile object to move.

Figure 12:
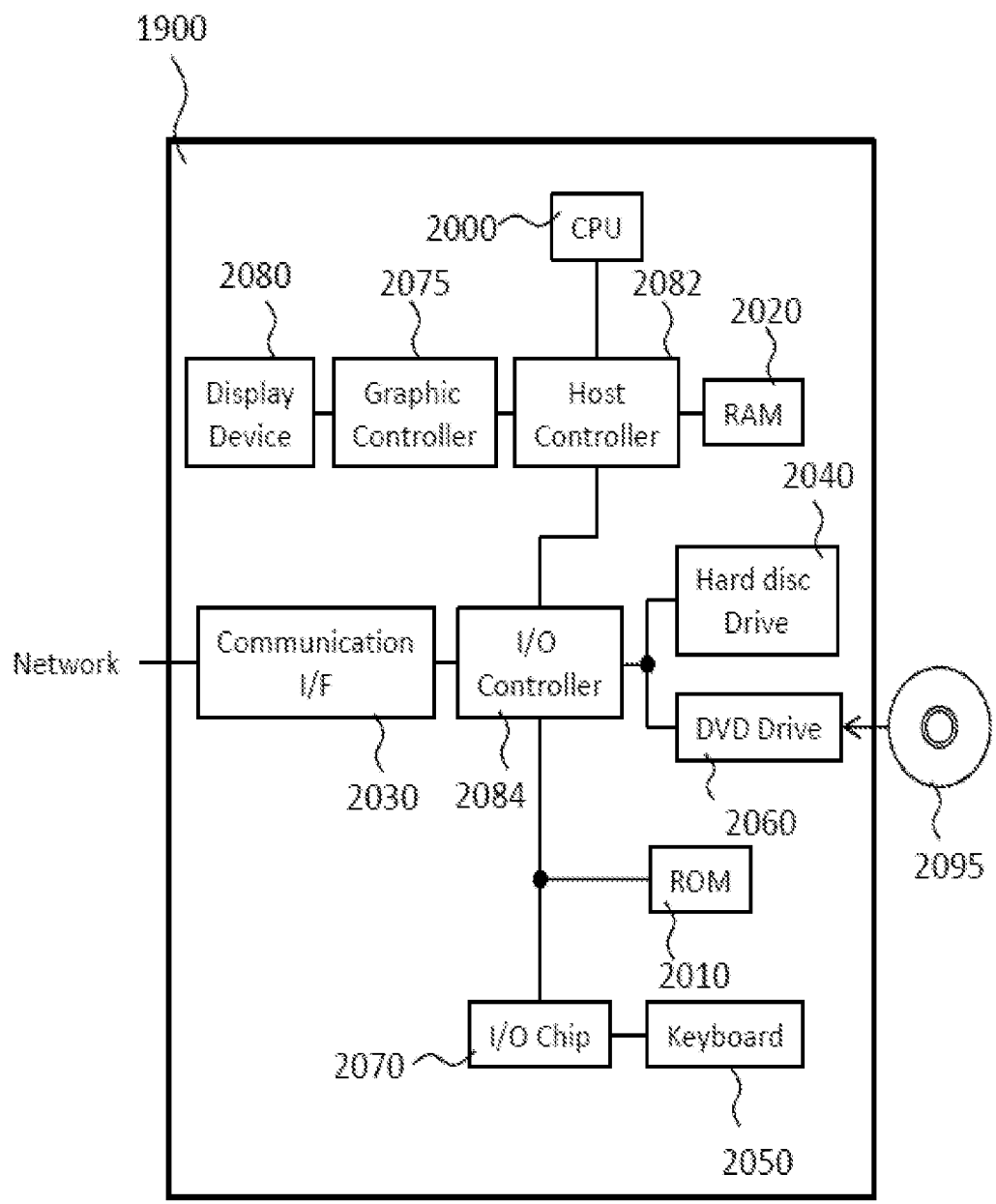
FIG. 12 shows a computer, according to an embodiment of the present invention.

FIG. 12 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the region manager, the subsystems 200 and other element(s) in the system 100 of FIG. 3 and FIG. 14, includes a determining module. The program or module acts on the CPU 2000, to cause the computer 1900 to function as a section, component, element such as determining section 146 and receiving section 252.

The information processing described in these programs is read into the computer 1900, to function as the determining section and receiving section, which is the result of cooperation between the program or module and the above-mentioned various types of hardware resources. Moreover, the apparatus is constituted by realizing the operation or processing of information in accordance with the usage of the computer 1900.

For example, when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a system for managing geographic space and moving objects thereon.

What is claimed is:

1. A system comprising:
   a processor; and
   one or more computer readable mediums collectively including instructions that, when executed by the processor, cause the processor to:
   receive information of occurrence of a disaster;
   determine a plurality of evacuation areas based on the disaster;
   determine a plurality of locations of a plurality of mobile objects in a geographic space, wherein the mobile objects move throughout the geographic space; and
   coordinate the movement of the plurality of mobile objects to the plurality of evacuation areas, wherein coordinating the movement comprises:
   obtain a location of an evacuee in the geographic space;
   assign a mobile object of the plurality of mobile objects to the evacuee; and
   direct the assigned mobile object to transport the evacuee to an evacuation area among the plurality of evacuation areas.

2. The system of claim 1, wherein
   the instructions further cause the processor to estimate a congestion of at least one route in the geographic space; and
   the coordination of movement is further based on the congestion of the at least one route.

3. The system of claim 1, wherein the instructions further cause the processor to:
   cause the assigned mobile object to move to the location of the at least one evacuee.

4. The system of claim 1, wherein the instructions further cause the processor to:
   select a mobile object among the plurality of mobile objects to assign to at least one evacuee based on a number of evacuees at a location of the at least one evacuee and a maximum number of passengers of the selected mobile object.

5. The system of claim 3, wherein the instructions further cause the processor to:
   send a message indicating that the assigned mobile object is coming to the location of the at least one evacuee to a communication device of the at least one evacuee.

6. The system of claim 1, wherein the instructions further cause the processor to:
   obtain a location of at least one evacuee, cause at least one mobile object, which is not assigned to the at least one evacuee, to move to an evacuation area without any evacuees on board.

7. The system of claim 6, wherein the instructions further cause the processor to:
   assign a higher priority of evacuation to at least one mobile object among the plurality of mobile objects with at least one evacuee on board than at least one mobile object among the plurality of mobile objects without any evacuees on board, and cause the plurality of mobile objects to move to the plurality of evacuation areas based on the priority of evacuation.

8. The system of claim 7, wherein the instructions further cause the processor to cause a first mobile object among the plurality of mobile objects having a higher priority than a second mobile object among the plurality of mobile objects to pass the second mobile object.

9. The system of claim 7, wherein the instructions further cause the processor to:
cause a first mobile object among the plurality of mobile objects having a higher priority than a second mobile object among the plurality of mobile objects to move before causing the second mobile object to move.

10. The system of claim 1, wherein the instructions further cause the processor to:
receive information from a mobile object among the plurality of mobile objects, the information including a status of a route, and cause at least one mobile object among the plurality of mobile objects to select or avoid the route based on the status of the route.

11. The system of claim 1, wherein the mobile object comprises a vehicle.

12. A computer-implemented method comprising:
receiving information of occurrence of a disaster;
determining of a plurality of evacuation areas based on the disaster;
determining a plurality of locations of a plurality of mobile objects in a geographic space, wherein the mobile objects move throughout the geographic space; and
coordinating the movement of the plurality of mobile objects into the plurality of evacuation areas according to a distribution based on the information of the plurality of evacuation areas and the plurality of locations, wherein coordinating the movement comprises:
obtaining a location of an evacuee in the geographic space;
assigning a mobile object of the plurality of mobile objects to the evacuee; and
directing the assigned mobile object to transport the evacuee to an evacuation area among the plurality of evacuation areas.

13. The computer-implemented method of claim 12, further comprising estimating a congestion of at least one route in the geographic space; and wherein the coordinating the movement is further based on the congestion of the at least one route.

14. The computer-implemented method of claim 12, further comprising:
causing the assigned mobile object to move to the location of the at least one evacuee.

15. The computer-implemented method of claim 12, further comprising selecting a mobile object among the plurality of mobile objects to assign to at least one evacuee based on a number of evacuees at a location of the at least one evacuee and a maximum number of passengers of the selected mobile object.

16. The computer-implemented method of claim 12, wherein the mobile object comprises a vehicle.

17. A computer program product comprising a non-transitory computer readable storage medium having program instructions embodied therewith, the program instructions executable by a computer to cause the computer to perform operations comprising:
receive information of occurrence of a disaster;
determine a plurality of evacuation areas based on the disaster;
determine a plurality of locations of a plurality of mobile objects in a geographic space, wherein the mobile objects move throughout the geographic space; and
coordinate the movement of the plurality of mobile objects to the plurality of evacuation areas, wherein coordinating the movement comprises:
obtain a location of an evacuee in the geographic space;
assign a mobile object of the plurality of mobile objects to the evacuee; and
direct the assigned mobile object to transport the evacuee to an evacuation area among the plurality of evacuation areas.

18. The computer program product of claim 17, wherein the instructions further cause the computer to estimate a congestion of at least one route in the geographic space; and
the coordination of movement is further based on the congestion of the at least one route.

19. The computer program product of claim 17, wherein the instructions further cause the computer to:
cause the assigned mobile object to move to the location of the at least one evacuee.

20. The computer program product of claim 17, wherein the mobile object comprises a vehicle.

* * * * *